United States Patent
Lee et al.

(10) Patent No.: US 8,005,170 B2
(45) Date of Patent: Aug. 23, 2011

(54) APPARATUS AND METHOD FOR DETECTING A SIGNAL IN A COMMUNICATION SYSTEM USING MULTIPLE ANTENNAS

(75) Inventors: Joo-Hyun Lee, Suwon-si (KR);
Sang-Boh Yun, Seongnam-si (KR);
Young-Hoon Kwon, Seongnam-si (KR);
Sung-Soo Hwang, Suwon-si (KR);
Jong-In Kim, Suwon-si (KR);
Hyun-Cheol Park, Daejeon (KR);
Hyoun-Kuk Kim, Ulsan (KR);
Ki-Hwan Jeon, Seoul (KR)

(73) Assignees: Samsung Electronics Co., Ltd., Suwon-si (KR); Information and Communications University, Research and Industrial Cooperation Group, Daejeon (KR)

( * ) Notice: Subject to any disclaimer, the term of this patent is extended or adjusted under 35 U.S.C. 154(b) by 984 days.

(21) Appl. No.: 11/871,598

(22) Filed: Oct. 12, 2007

(65) Prior Publication Data

US 2008/0089446 A1 Apr. 17, 2008

(30) Foreign Application Priority Data

Oct. 12, 2006 (KR) .......................... 10-2006-0099327

(51) Int. Cl.
*H03D 1/00* (2006.01)
(52) U.S. Cl. ......... 375/341; 375/262; 375/316; 375/340
(58) Field of Classification Search .................. 375/262, 375/316, 340, 341
See application file for complete search history.

(56) References Cited

U.S. PATENT DOCUMENTS

2006/0104390 A1   5/2006   Graef et al.
2009/0213965 A1   8/2009   Maeda et al.

FOREIGN PATENT DOCUMENTS

| JP | 2006-270430 A | 10/2006 |
| KR | 1997-0705248 A | 9/1997 |
| WO | 96/02983 A1 | 2/1996 |

OTHER PUBLICATIONS

Hiroyuki Kawai et al "Adaptive Control of Surviving Symbol Replica Candidates in QRM-MLD for OFDM MIMO Multiplexing" IEEE Jun. 2006.*

* cited by examiner

*Primary Examiner* — Leon Flores
(74) *Attorney, Agent, or Firm* — Jefferson IP Law, LLP

(57) ABSTRACT

A method and apparatus for detecting a signal in a communication system using at least two transmit antennas are provided. The signal detection method and apparatus includes selecting a symbol corresponding to a lowest branch metric from among symbols, the number of which corresponds to a modulation scheme, determining a candidate symbol by extending a process of selecting a symbol corresponding to a lowest branch metric from among the selected symbols, to a number which is less by one than the number of the transmit antennas, setting an accumulated branch metric of the candidate symbol as a threshold, removing a symbol having an accumulated branch metric higher than the threshold, and selecting, as a last received symbol, a symbol corresponding to a path having the lowest accumulated branch metric among paths selected without being removed until a last stage.

12 Claims, 8 Drawing Sheets

------- SEARCHED BRANCH
———— SELECTED BRANCH

APPARATUS AND METHOD FOR DETECTING A SIGNAL IN A COMMUNICATION SYSTEM USING MULTIPLE ANTENNAS

PRIORITY

This application claims the benefit under 35 U.S.C. §119 (a) of a Korean Patent Application filed in the Korean Intellectual Property Office on Oct. 12, 2006 and assigned Serial No. 2006-99327, the entire disclosure of which is hereby incorporated herein by reference.

JOINT RESEARCH AGREEMENT

The claimed invention was made by, on behalf of, and/or in connection with one or more of the following parties to a joint university-corporation research agreement: Samsung Electronics Co., Ltd. and Information and Communications University, Research and Industrial Cooperation Group. The agreement was in effect on and before the date the claimed invention was made and the claimed invention was made as a result of activities undertaken within the scope of the agreement

BACKGROUND OF THE INVENTION

1. Field of the Invention

The present invention relates generally to a communication system. More particularly, the present invention relates to an apparatus and method for detecting a signal in a communication system using multiple antennas.

2. Description of the Related Art

In the field of communication system technologies, active research and development is being conducted with the goal of providing high-quality, high-speed and high-capacity data transmissions for multimedia services. Unlike a wired channel environment, a wireless channel environment, existing in such a communication system, may suffer from signal distortion due to several factors such as multipath interference, shadowing, propagation loss, time-varying noise, interference and the like. A received signal that suffers from such distortion during its transmission causes a reduction in the entire performance of the mobile communication system. As a result, the fading phenomenon, which is a distortion of the amplitude and phase of the received signal, can be a main cause of interruption of the high-speed data communication in the wireless channel environment. Accordingly, many attempts are being made to solve the fading phenomenon and the Multiple-Input Multiple-Output (MIMO) technology has been proposed as a solution.

The Vertical-Bell Labs Layered Space-Time (V-BLAST) communication system is one such MIMO-based communication system. In the V-BLAST communication system, a transmitter (or transmitting entity) uses a plurality of transmit antennas and transmits different independent data separately via each of the transmit antennas.

FIG. 1 schematically illustrates a configuration of a conventional V-BLAST communication system.

Referring to FIG. 1, an expected transmission signal is modulated by a modulator 102 and then transmitted via transmit antennas 104 and 106. The signal transmitted over a wireless channel is input to a detector 114 via a plurality of receive antennas 110 and 112. The detector 114 detects the original transmission signal using any one of various detection techniques such as a Maximum Likelihood Detection (MLD) technique. A concern with the MLD technique is that it exponentially increases in its complexity according to the number of antennas and a modulation order of the transmitter.

A QR Decomposition based M (QRD-M) algorithm has been proposed as a scheme for solving such a problem.

FIG. 2 illustrates a tree searching technique of a conventional QRD-M algorithm.

Referring to FIG. 2, there is shown a 3×3 V-BLAST system using Quadrature Phase Shift Keying (QPSK) as a modulation scheme, by way of example. A received signal is extended to 4 candidate symbols according to the modulation order ($1^{st}$ Stage). That is, M=4.

Among the extended 4 candidate symbols, 4 candidate symbols are selected in order of the lower accumulated metric and each of the selected candidate symbols is extended again to 4 branches and candidates ($2^{nd}$ Stage).

Among all the extended branches, 4 branches are selected in order of the lower metric, and each of the candidate symbols corresponding to the selected branches is extended again to 4 branches and candidates. In this manner, the candidate having the lowest accumulated metric among the last candidates is determined as a received symbol ($3^{rd}$ Stage).

Various QRD-M algorithms will be described hereinbelow.

First, a description will be made of a QRD-M algorithm proposed in a paper by Kyeong Jin Kim and Ronald A. Iltis, titled "Joint detection and channel estimation algorithms for QS-CDMA signals over time-varying Channels," IEEE Transactions on communications, Vol. 50, NO. 5, May 2002.

A receiver (or receiving entity) generates a tree structure using a characteristic of an R matrix generated after performing QR decomposition on a channel. The number of stages of the tree is equal to the number of transmit antennas, and the number of branches that can be extended from the branches of each stage to the next stage is determined depending on the modulation order in use. All branches of the tree are searched using a Maximum Likelihood (ML) technique. However, for M, only M branches are selected in each stage, and the branches selected in the corresponding stage are extended to as many branches as the modulation order in the next stage. When a value of the M is equal to the modulation order, performance of the QRD-M algorithm approaches the ML performance.

However, the QRD-M algorithm also has problems. If the M value is less than the modulation order, the QRD-M algorithm suffers from performance degradation. Therefore, when the QRD-M algorithm uses a plurality of transmit antennas and employs a high modulation order, its complexity is much lower than the complexity $O(M^{N_t})$ for the case where it uses an ML receiver. However, the QRD-M algorithm still requires a large amount of calculation.

Second, a description will be made of a QRD-M algorithm (hereinafter referred to as a 'Nokia QRD-M algorithm') proposed in a paper by Kyeong Jin Kim, Jiang Yue, Ronald A. Iltis and Jerry D. Gibson, titled "A QRD-M/Kalman Filter-Based Detection and Channel Estimation Algorithm for MIMO-OFDM Systems," IEEE Transactions on wireless communications, Vol. 4, NO. 2, March 2005.

The number 'M' of branches selected in each stage of the Nokia QRD-M algorithm has an adaptive value rather than a constant value. That is, a lower M value is determined for the signal having a higher channel gain and a higher M value is determined for the signal having a lower channel gain. For determination of the M value, a receiver finds a Probability Density Function (PDF) for a square of $R_{11}$ corresponding to the first stage of the tree structure through QR decomposition of a channel matrix. Of course, the receiver should find accumulated metrics for all possible candidate symbols in the first stage.

The maximum value $\hat{M}$ of the candidate symbols selected in each stage is predetermined and the receiver divides the found PDF into $\hat{M}$ sections using a Lloyd-Max algorithm. Thereafter, the receiver finds power of a signal detected in each stage and selects as many paths as the number of candidate symbols having the lower accumulated metric from among the candidate symbols corresponding to the divided PDF sections. The receiver selects $\hat{M}$ candidate symbols in the section having the lowest signal power and selects the candidate symbols corresponding to the value decreased by one in the next section. The sections can be divided as Equation (1).

$$\Delta_R \in [0 th_1]: M = \hat{M},$$
$$\Delta_R \in [th_1, th_2]: M = \hat{M}-1, \ldots \quad (1)$$
$$\Delta_R \in [th_{\hat{M}-1}, th_{\hat{M}}]: M = 1$$

If the $\hat{M}$ value is equal to a value of the modulation order, the Nokia QRD-M algorithm approaches the ML performance in terms of the performance while requiring 75% complexity for the case of M=16 of the QRD-M algorithm.

However, the Nokia QRD-M algorithm also has the following problem.

To find the PDF for a square of $R_{11}$ used for determining candidate symbols that will survive in each stage, the Nokia QRD-M algorithm needs training symbols. Because the Nokia QRD-M algorithm should use the training symbols several times to find the PDF for the square of $R_{11}$, its complexity may further increase. The PDF for the square of $R_{11}$ found for signal detection in the first stage after QR decomposition on the channel matrix is used intact even in the remaining stages of the tree structure, making it difficult to detect the optimal number of candidates.

Finally, a description will be made of a QRD-M algorithm (hereinafter referred to as an 'NTT DoCoMo QRD-M algorithm') proposed in a paper by Hiroyuki Kawai, Kenichi Higuchi, Noriyuki Maeda and Mamoru Sawahashi, titled "Independent Adaptive Control of Surviving Symbol Replica Candidates at Each Stage Based on Minimum Branch Metric in QRM-MLD for OFCDM MIMO Multiplexing," NTT DoCoMo, Inc.

The number of candidates for each stage of the NTT DoCoMo QRD-M algorithm can be set in a different manner. A receiver, after generating a tree structure through QR decomposition on a channel matrix, finds accumulated metrics for all possible candidate symbols in the first stage. A threshold is determined by selecting the lowest accumulated metric from among the accumulated metrics and multiplying estimated noise power by a predetermined constant X. A threshold in each stage can be determined using Equation (2).

$$\Delta_n = E_{n,min} + X\sigma^2 \quad (2)$$

In Equation (2), $E_{n,min}$ denotes the minimum accumulated metric in an $n^{th}$ stage, X denotes a predetermined value and $\sigma_2$ denotes noise power. The maximum number $\hat{M}$ of candidate symbols selectable in each stage is predetermined. In the first stage, the receiver selects candidate symbols having accumulated metrics lower than the threshold. Thereafter, from the second stage on, the threshold is determined using the lowest accumulated metric and the estimated noise power. In the last stage, the candidate symbol having the lowest accumulated metric among the surviving branches is estimated as a transmission signal.

It can be noted that the NTT DoCoMo QRD-M algorithm needs the lowest accumulated metric and the estimated noise power to determine the threshold. Therefore, the NTT DoCoMo QRD-M algorithm may need additional complexity for estimating the noise power and its complexity may be subject to change according to an error of the estimated noise power. In addition, when the threshold cannot be appropriately set, calculation for the last symbol estimation may increase.

SUMMARY OF THE INVENTION

An aspect of the present invention is to address at least the above mentioned problems and/or disadvantages and to provide at least the advantages described below. Accordingly, an aspect of the present invention is to provide a tree searching apparatus and method with reduced complexity in a communication system.

According to one aspect of the present invention, a method for detecting a signal in a communication system using at least two transmit antennas is provided. The signal detection method includes selecting a symbol corresponding to a lowest branch metric from among symbols, the number of which corresponds to a modulation scheme, determining a candidate symbol by extending a process of selecting a symbol corresponding to a lowest branch metric from among the selected symbols, to a number which is less by one than the number of the transmit antennas, setting an accumulated branch metric of the candidate symbol as a threshold, removing a symbol having an accumulated branch metric higher than the threshold and selecting, as a last received symbol, a symbol corresponding to a path having the lowest accumulated branch metric among paths selected without being removed until a last stage.

According to another aspect of the present invention, a method for detecting a signal in a communication system using two transmit antennas is provided. The signal detection method includes extending a received signal to candidate symbols, the number. of which corresponds to a modulation scheme, determining an accumulated branch metric of each of the candidate symbols, selecting a candidate symbol having a lowest accumulated branch metric among the accumulated branch metrics, extending the selected candidate symbol to candidate symbols, the number of which corresponds to the modulation scheme, determining a candidate symbol having a lowest accumulated branch metric among the extended candidate symbols, determining, as a first threshold, a lowest accumulated branch metric of the determined candidate symbol, removing a candidate symbol having an accumulated branch metric higher than the first threshold from among all candidate symbols, extending a non-removed candidate symbol to candidate symbols, the number of which corresponds to the modulation scheme, and detecting, as a last received symbol, a candidate symbol having a lowest accumulated branch metric among the extended candidate symbols.

According to further another aspect of the present invention, a method for detecting a signal in a communication system using three transmit antennas is provided. The signal detection method includes extending a received signal to candidate symbols, the number of which corresponds to a predetermined modulation scheme, determining an accumulated branch metric indicating a Euclidean distance of each candidate symbol, selecting a candidate symbol having a lowest accumulated branch metric among the accumulated branch metrics, extending the selected candidate symbol to candidate symbols, the number of which corresponds to the modulation scheme, selecting a candidate symbol having a lowest accumulated branch metric from among the extended candidate symbols, branching the selected candidate symbol into candidate symbols, the number of which corresponds to the modulation scheme, determining, as a first threshold, a candidate symbol having a lowest accumulated branch metric among the branched candidate symbols, removing a candidate symbol corresponding to an accumulated branch metric higher than the first threshold from among all candidate symbols, extending each of non-removed candidate symbols to candidate symbols, the number of which corresponds to the modulation scheme, selecting a candidate symbol having a lowest accumulated branch metric from among the extended candidate symbols, if an accumulated branch metric of the selected candidate symbol is lower than the first threshold, extending the candidate symbol to determine a second threshold, extending a candidate symbol having an accumulated branch metric higher than the second threshold among the candidate symbols to candidate symbols, the number of which corresponds to the modulation scheme and detecting, as a last received symbol, a candidate symbol having a lowest accumulated branch metric among the extended candidate symbols.

According to yet another aspect of the present invention, an apparatus for detecting a signal in a communication system using at least two transmit antennas is provided. The signal detection apparatus includes a tree structure generator for generating a tree having candidate symbols for signal detection and branches for connecting the candidate symbols by performing QR decomposition on a channel estimation matrix and for multiplying the decomposition result by a received signal, a branch metric calculator for calculating metrics of the branches, an accumulated branch metric calculator for calculating an accumulated branch metric of the branch connected to each of the candidate symbols by accumulating metrics of the branches, a path selector for selecting a candidate symbol having a lowest accumulated branch metric separately in each stage of the tree and for selecting a path for allowing the accumulated branch metric to be lowest even in a last stage, a threshold determiner for determining a lowest accumulated branch metric in the last stage, as a threshold for removing a branch unnecessary in each stage, a branch selector for selecting a remaining branch except for a branch connected to a candidate symbol having an accumulated branch metric lower than the determined threshold and a controller for detecting a last received signal.

BRIEF DESCRIPTION OF THE DRAWINGS

The above and other aspects, features and advantages of exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

Figure 1:
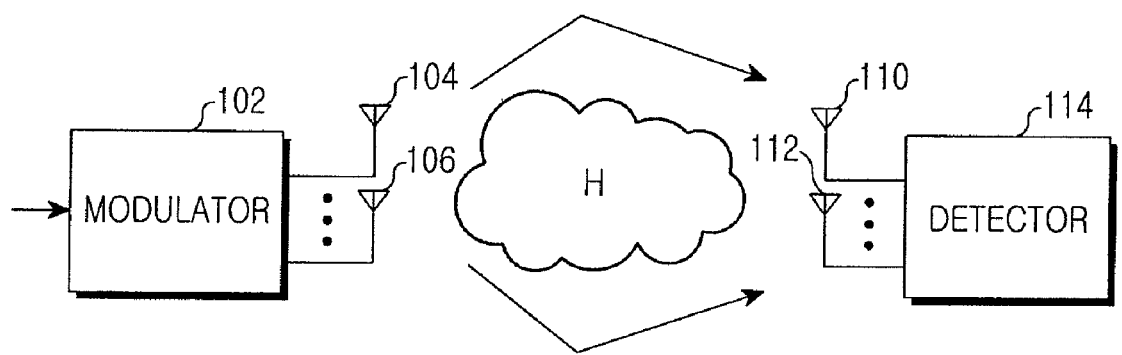
FIG. 1 schematically illustrates a configuration of a conventional V-BLAST communication system.
Figure 2:
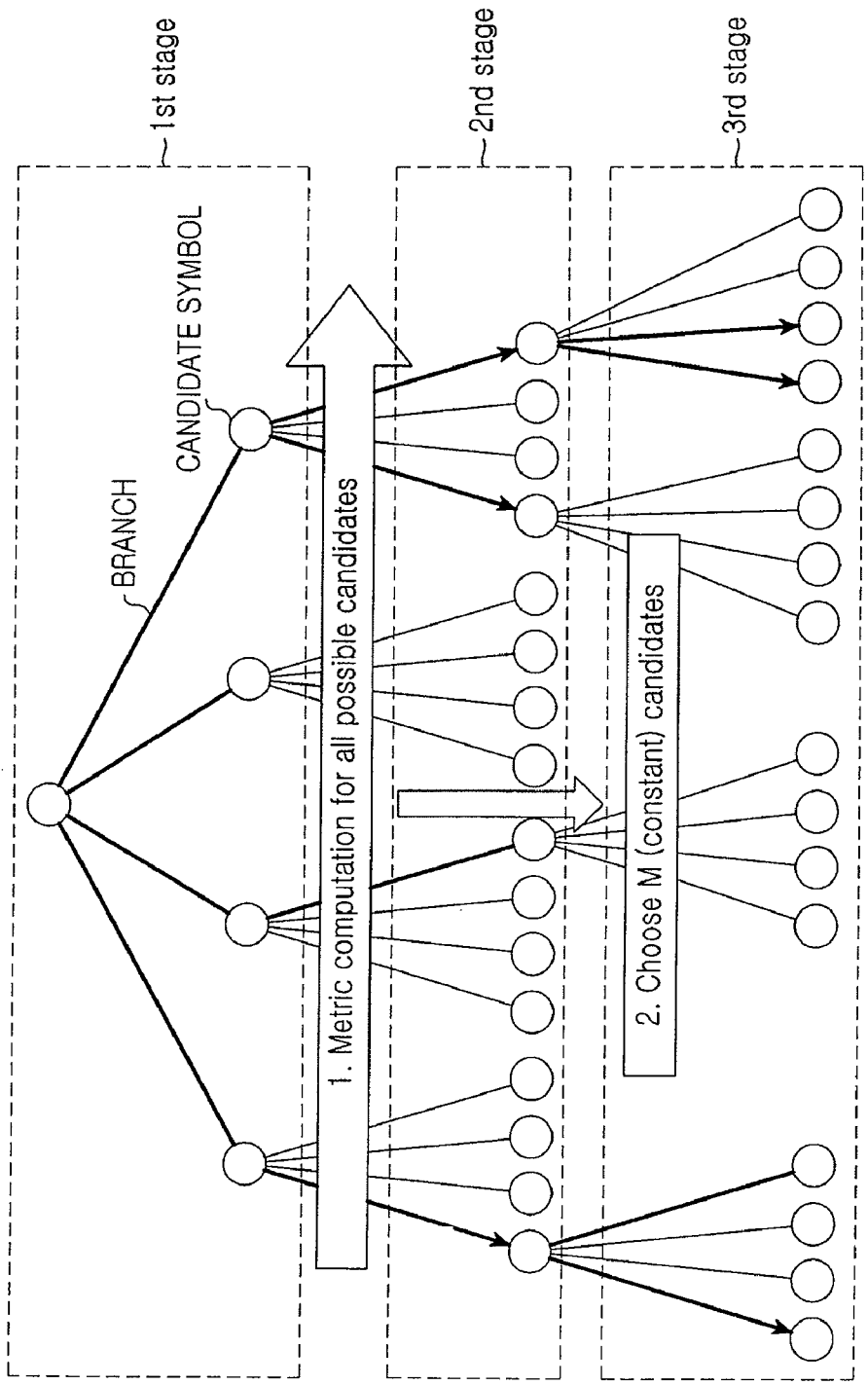
FIG. 2 illustrates a tree searching technique of a conventional QRD-M algorithm.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a tree searching apparatus and method with noticeably reduced complexity in a communication system using multiple antennas. The tree searching method is a method in which a receiver estimates a received signal. In exemplary embodiments of the present invention, the tree searching method will be referred to as a 'partial QR Decomposition based M (QRD-M) algorithm' or 'partial tree searching'. Exemplary embodiments of the present invention can be efficiently applied to multi-antenna communication systems using the Vertical-Bell Labs Layered Space-Time (V-BLAST) scheme in which each transmit antenna sends different independent data.

To reduce the calculation complexity in a tree structure, it is important to reduce the number of branch candidates in the upper stage rather than to reduce the number of branch candidates in the lower stage. Therefore, exemplary embodiments of the present invention find a threshold by generating a tree through QR decomposition and performing partial decision-feedback detection in each stage. Thereafter, exemplary embodiments of the present invention leave only valid candidate symbols having accumulated metrics lower than the threshold.

Using the following equations, a description will now be made of an exemplary method for detecting transmission signals by QR decomposition.

$$r = Hs + n \quad (3)$$

In Equation (3), $r \in C^{N_r \times 1}$ denotes a reception vector, $s \in C^{N_t \times 1}$ denotes a transmission vector, and $H \in C^{N_r \times N_t}$ denotes an Independently and Identically Distributed (i.i.d) channel matrix, where $N_t$ denotes the number of transmit antennas and $N_r$ denotes the number of receive antennas. In addition, n denotes a noise vector. The channel matrix can be expressed using the QR decomposition technique. In this case, a Q matrix has a characteristic of a unitary matrix and an R matrix is an upper triangular matrix. Therefore, the channel matrix, when the QR decomposition technique is applied thereto, can be expressed as Equation (4).

$$\begin{aligned} r &= Hs + n \\ &= QRs + n \\ y &= Q^H r \\ &= Q^H QRs + Q^H n \\ &= Rs + n \end{aligned} \quad (4)$$

The QRD-M algorithm estimates symbols by selecting only M branches rather than searching all possible branches separately for each stage. The value of M is less than or equal to the modulation order.

A system having $N_t$ transmit antennas and $N_r$ receive antennas is assumed herein. A metric for all possible cases of a signal $s_1$ corresponding to the first stage of the tree structure can be calculated by Equation (5).

$$|y_1 - R_{1,1}\hat{s}_1|^2 \qquad (5)$$

M branches are selected in order of the lowest metric from among the metrics for all branches of the first stage. Each of the selected M branches is extended again to M branches in the second stage. In an $i^{th}$ stage (where $1 \leq i \leq N_t$), each branch metric is calculated using Equation (6).

$$|y_1 - R_{N_t-i+1}s_i|^2 \qquad (6)$$

In Equation (6), $y_i$ denotes an $i^{th}$ component of y, $R_i$ denotes an $i^{th}$ row vector of R and $s_i$ denotes branch vectors of a particular path.

The foregoing general QRD-M algorithm can be summarized as follows:

1. The algorithm performs QR decomposition on a channel matrix H.
2. The algorithm multiplies a received signal r by $Q^H$.
3. The algorithm extends all branches to as many branches as a modulation order.
4. The algorithm finds a branch metric through Euclidean distance measurement.
5. The algorithm leaves only M branches among the branches according to the found metric, and discards the remaining branches.
6. The algorithm shifts to the next stage and re-performs the process from Step 3.

A description will now be made of a method for estimating received symbols using the partial tree searching scheme according to an exemplary embodiment of the present invention.

Figure 3:
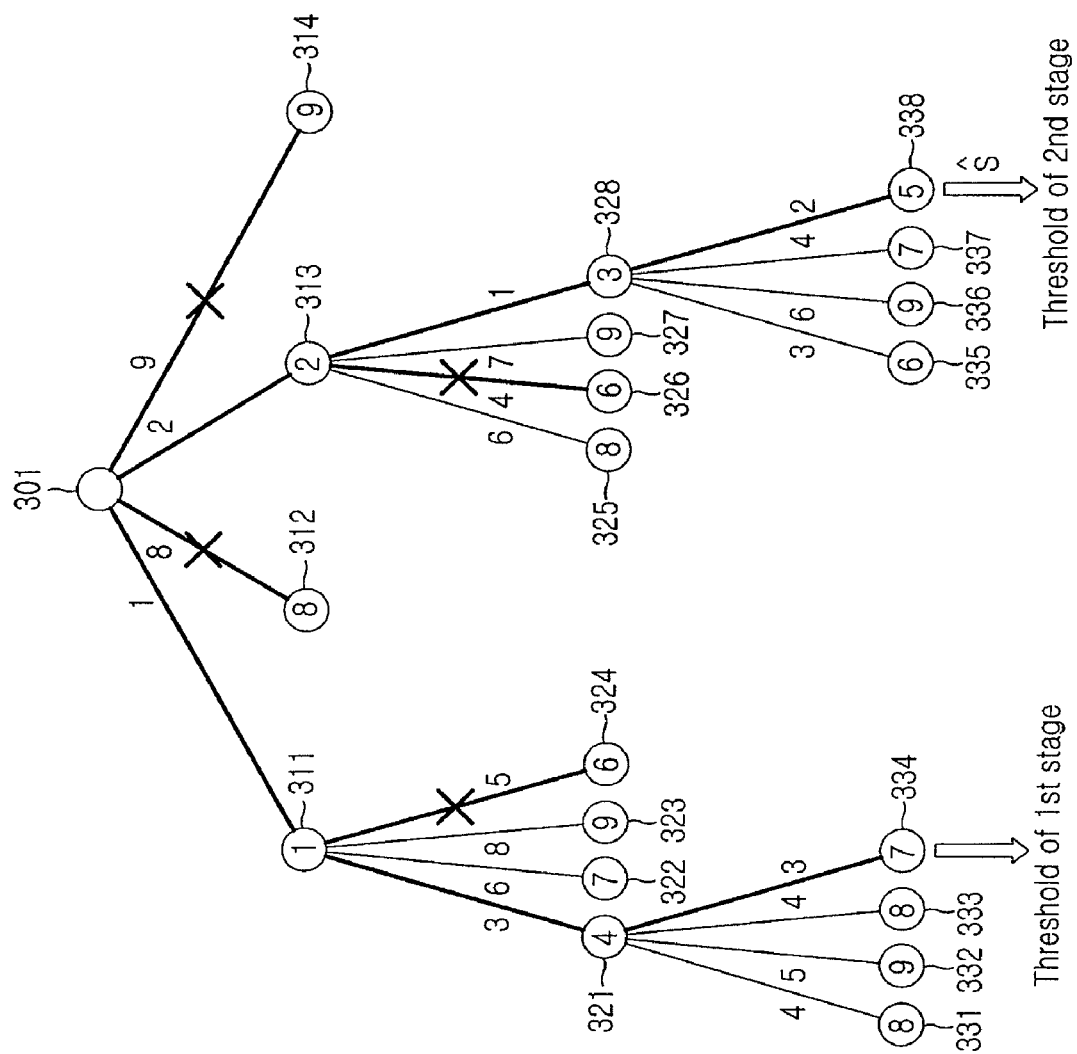
FIG. 3 illustrates a method for estimating received symbols at a receiver using a partial tree searching scheme according to an exemplary embodiment of the present invention.

FIG. 3 illustrates a method for estimating received symbols at a receiver using a partial tree searching scheme according to an exemplary embodiment of the present invention.

Referring to FIG. 3, an exemplary implementation employs 3 transmit antennas and a QPSK modulation scheme such that a tree structure has 3 stages and each symbol is extended to 4 candidate symbols. Similarly, each symbol can be extended to 2 candidate symbols in Binary Phase Shift Keying (BPSK), to 16 candidate symbols in 16-ary Quadrature Amplitude Modulation (16QAM) and to 64 candidate symbols in 64QAM.

In FIG. 3, each circle will be referred to as a 'candidate symbol' and each line will be referred to as a 'branch'. Numerals in the circles indicate accumulated branch metrics, and numerals on the branches indicate branch metrics. However, the first candidate symbol 301 is a mere notation indicating a starting point and is not a symbol. In the following description, however, it will be referred to as a candidate symbol, for convenience.

The first candidate symbol 301 is extended to 4 branches, generating 4 candidate symbols. Branch metrics of the branches have values of 1, 8, 2 and 9, respectively, starting from the left side of the figure. Therefore, candidate symbols 311, 312, 313 and 314 have accumulated branch metrics of 1, 8, 2 and 9, respectively. Herein, the accumulated path metrics of the candidate symbols can be expressed as $E_{1,k}$ for $k \in \{1,2,\ldots,M\}$, where $E_{i,k}$ denotes a $k^{th}$ surviving branch in the first stage (i=1). This can be expressed as Equation (7).

$$E_{i,k} > \zeta_1 = \|y - R\hat{s}_i\|^2 \geq E^{\hat{s}}_{opt} = \|y - R\hat{s}_{opt}\|^2 \qquad (7)$$

In Equation (7), $\hat{s}_{opt}$ denotes a signal set corresponding to an optimum ML point, and $E_{\hat{s}_{opt}}$ denotes an accumulated branch metric corresponding to $\hat{s}_{opt}$. In an $i^{th}$ stage, a threshold is always greater than or equal to a value of $E_{\hat{s}_{opt}}$. Therefore, removing the branches having accumulated branch metrics higher than the threshold in the $i^{th}$ stage is equivalent to removing only the unnecessary branches. In this manner, the receiver can obtain ML performance with low complexity.

The receiver selects a candidate symbol having the lowest accumulated branch metric from among the candidate symbols. In the exemplary implementation of FIG. 3, candidate symbol 311 has the lowest accumulated branch metric from among the candidate symbols and accordingly would be selected by the receiver. Herein, the candidate symbol 311 is a signal transmitted by a first transmit antenna, and the selected candidate symbol 311 is branched into 4 branches, generating 4 candidate symbols 321, 322, 323 and 324. Here, the branch metrics have values of 3, 6, 8 and 5, respectively, starting from the left side of the figure. The receiver selects a branch or symbol having the lowest branch metric or the lowest accumulated branch metric among the branch metrics. In the exemplary implementation of FIG. 3, candidate symbol 321 has the lowest branch metric and the lowest accumulated branch metric from among the branch metrics 321, 322, 323 and 324. Accordingly, candidate symbol 321 would be selected by the receiver.

The candidate symbol 321 is branched again into 4 branches, generating 4 candidate symbols 331, 332, 333 and 334. Here, the branch metrics have values of 4, 5, 4 and 3, respectively, starting from the left side of the figure. The receiver selects a branch having the lowest branch metric and a candidate symbol corresponding thereto. In the exemplary implementation of FIG. 3, candidate symbol 334 is generated by a branch having the lowest branch metric of 3 and is accordingly selected. In the present invention, the accumulated branch metric 7 of the candidate symbol 334 is a first threshold used for removing the branches unnecessary in the upper stage.

Therefore, the branches corresponding to the candidate symbols 312 and 314 having accumulated branch metrics higher than the accumulated branch metric 7 should be removed from among the 4 branches of the first stage. That is, the branches having branch metrics 8 and 9 are removed.

The candidate symbols 311 and 313 associated with the surviving branches (branches having branch metrics of 1 and 2) except for the removed branches are each extended again to 4 branches according to the modulation order. Therefore, the candidate symbols 311 and 313 are branched into a total of 8 branches, generating 8 candidate symbols 321, 322, 323, 324, 325, 326, 327 and 328. Here, the 8 branch metrics have values of 3, 6, 8, 5, 6, 4, 7 and 1, respectively, starting from the left side of the figure. M=4 branches are selected from among the 8 branches in order of the lower branch metric.

The receiver calculates only the accumulated branch metrics of the candidate symbols corresponding to the 4 branches. The calculated accumulated branch metrics of the 4 candidate symbols have values 4, 6, 6 and 3 from the leftmost candidate symbol. The receiver selects candidate symbol 328 having the lowest accumulated branch metric from among the 4 candidate symbols 321, 324, 326 and 328.

Therefore, the candidate symbol 328 is branched into 4 branches, generating 4 candidate symbols 335, 336, 337 and 338 corresponding thereto. Here, the metrics of the 4 branches have values of 3, 6, 4 and 2, respectively, starting from the left side of the figure, and the accumulated branch metrics of the candidate symbols 335, 336, 337 and 338 have values of 6, 9, 7 and 5, respectively, starting from the left side of the figure. Therefore, the accumulated branch metric 5 of the candidate symbol 338 having the lowest accumulated branch metric becomes a second threshold in place of the first threshold.

Therefore, the branches corresponding to the candidate symbols 324 and 326 having accumulated branch metrics higher than the accumulated branch metric 5 are removed from among the 8 branches of the second stage.

The candidate symbols 321 and 328 associated with the surviving branches except for the removed branches are each extended again to 4 branches according to the modulation order. Therefore, the candidate symbols 321 and 328 are branched into a total of 8 branches, generating 8 candidate symbols 331 to 338. Here, metrics of the 8 branches have values 4, 5, 4, 3, 3, 6, 4 and 2 respectively, starting from the left side of the figure, and accumulated branch metrics of the corresponding candidate symbols have values 8, 9, 8, 7, 6, 9, 7 and 5 from the leftmost candidate symbol. The candidate symbol 338 having the lowest one of the accumulated branch metrics is determined. Herein, the candidate symbol 338 is a signal transmitted by a third transmit antenna. That is, the finally determined received signal vector is a signal vector $\hat{S}$ composed of the candidate symbols 311, 328 and 338.

Although the receiver herein estimates the last symbol using two thresholds in 3 stages, by way of example, the receiver can estimate the last symbol using a different number of thresholds, such as one threshold. For example, if the accumulated branch metrics of all candidate symbols are higher than the first threshold in the second stage of FIG. 3, the candidate symbol 334 having the first threshold is determined as the last symbol.

Figure 4:
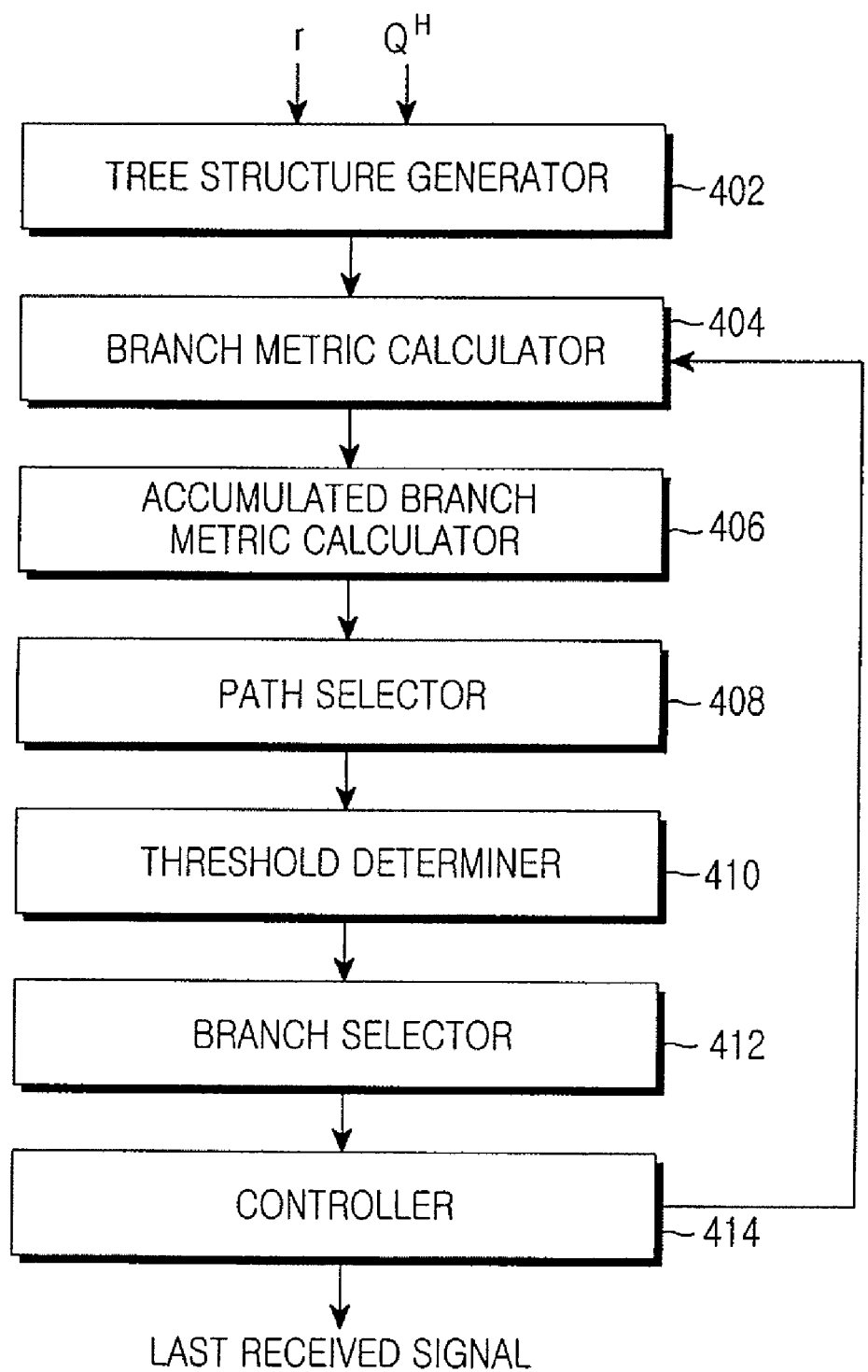
FIG. 4 illustrates a detector structure of a receiver according to an exemplary embodiment of the present invention.

FIG. 4 illustrates a detector structure of a receiver according to an exemplary embodiment of the present invention.

Referring to FIG. 4, a tree structure generator 402 generates a tree structure by multiplying a received signal r by $Q^H$ through QR decomposition on a channel estimation matrix H. In the generated tree structure, the first candidate symbol forms branches and candidate symbols, the number of which corresponds to the modulation order. A branch metric calculator 404 calculates branch metrics of the branches and outputs the calculated branch metrics to an accumulated branch metric calculator 406. The accumulated branch metric calculator 406 calculates accumulated branch metrics of the candidate symbols based on the input branch metrics and outputs the calculated information to a path selector 408.

The path selector 408 selects a candidate symbol having the lowest accumulated branch metric in a first stage and selects a path for allowing the accumulated branch metric of the selected candidate symbol to be lowest even in the last stage.

A threshold determiner 410 determines the lowest accumulated branch metric in the last stage as a threshold for removing branches unnecessary in the first stage according to the selected path and outputs the determined threshold information to a branch selector 412.

The branch selector 412 selects branches except for the candidate symbols having accumulated branch metrics lower than the threshold. The selected branch information is output to a controller 414.

The controller 414 extends the candidate symbols corresponding to the selected branches to branches and candidate symbols, the number of which corresponds to the modulation order. Herein, the controller 414 determines whether the current stage is the last stage and, if the current stage is the last stage, the controller 414 outputs the candidate symbol having the lowest accumulated branch metric among the extended candidate symbols as the last received signal vector. However, if the current stage is not the last stage, the controller 414 enables the branch metric calculator 404 and repeats the foregoing operations until the last received signal is output.

Figure 5:
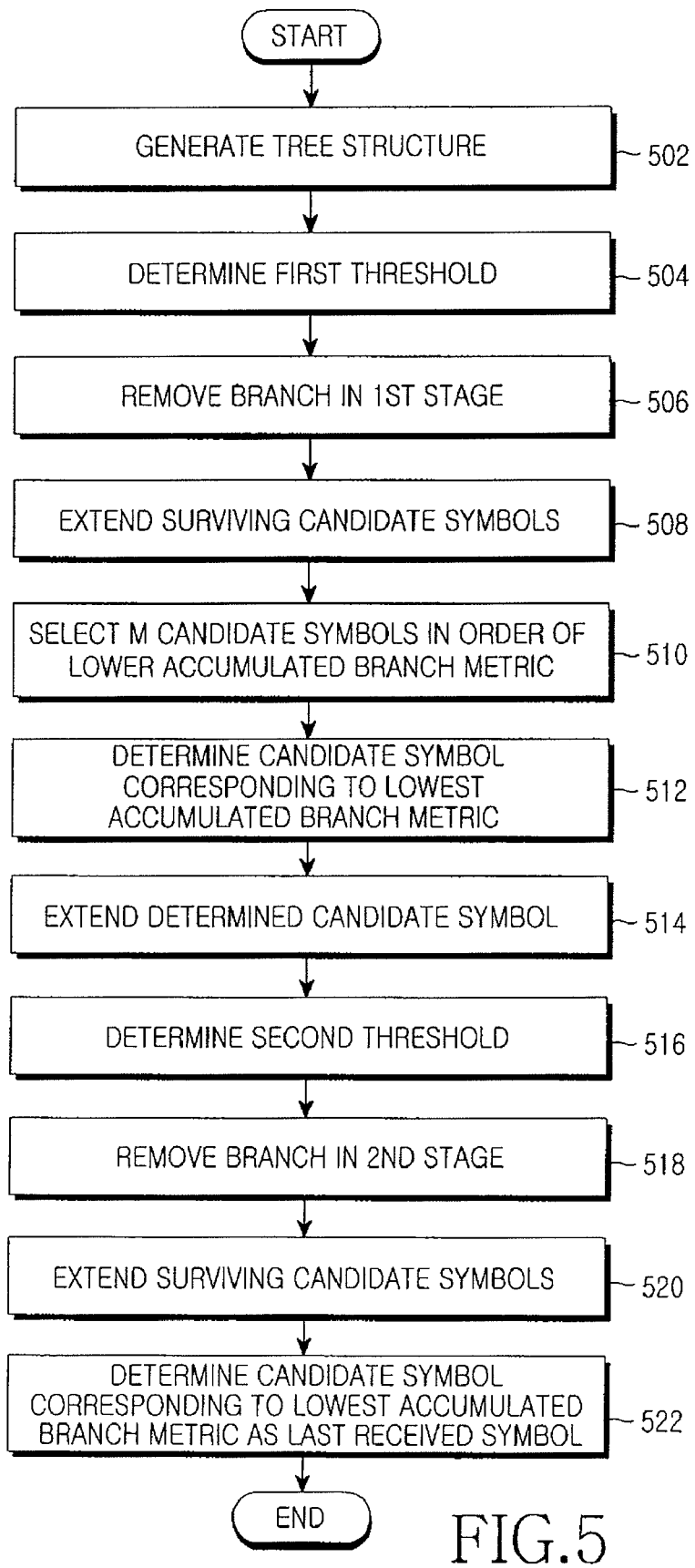
FIG. 5 illustrates a process of detecting a signal using a partial tree searching scheme according to an exemplary embodiment of the present invention.

FIG. 5 illustrates a process of detecting a signal using a partial tree searching scheme according to an exemplary embodiment of the present invention.

In the flowchart of FIG. 5, the number of transmit antennas is assumed to be 3. Therefore, there are a total of 3 stages as in FIG. 3. However, it is to be understood that the number of antennas illustrated in this example as well as in FIG. 3 is merely exemplary and the number of antennas may vary as desired or required by the system.

Referring to FIG. 5, in step 502, a receiver generates a tree structure by multiplying $Q^H$ obtained through QR decomposition by a received signal. In step 504, the receiver determines a first threshold. The first threshold is needed to remove the branches unnecessary in the first stage. Based on the first threshold, the receiver determines the candidate symbol having the lowest accumulated branch metric in the first stage, i.e. determines the received symbol estimated in the first stage, and then extends it to as many candidate symbols as the number corresponding to the modulation order. The receiver determines again the candidate symbol having the lowest accumulated branch metric among the extended candidate symbols in a second stage. The determined candidate symbol is extended again to candidate symbols, the number of which corresponds to the modulation order. The receiver determines the lowest accumulated branch metric among the extended accumulated branch metrics of the extended candidate symbols, as the first threshold in a third stage.

In step 506, the receiver removes branches having branch metrics lower than the first threshold. In step 508, the receiver extends each of surviving candidate symbols to candidate symbols, the number of which corresponds to the modulation order. In step 510, the receiver selects M candidate symbols from among the extended candidate symbols in order of the lower accumulated branch metric. Herein, M has a value less than or equal to the modulation order.

In step 512, the receiver determines, as a received symbol in the second stage, the candidate symbol having the lowest accumulated branch metric among the extended candidate symbols. In step 514, the receiver extends again the determined candidate symbol to candidate symbols, the number of which corresponds to the modulation order. In step 516, the receiver determines the lowest accumulated branch metric among the accumulated branch metrics of the extended candidate symbols, as a second threshold.

In step 518, the receiver removes candidate symbols having accumulated branch metrics higher than the second threshold from among the M candidate symbols. In step 520, the receiver extends each of the surviving remaining candidate symbols to candidate symbols, the number of which corresponds to the modulation order. In step 522, the receiver determines, as a received symbol in the third stage, the candidate symbol corresponding to the lowest accumulated branch metric.

Figure 6A:
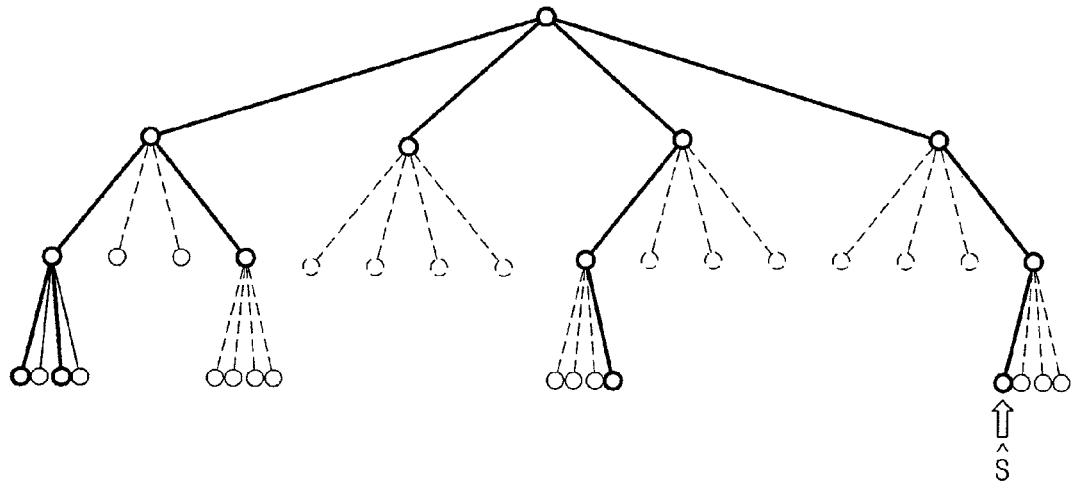
FIGS. 6A and 6B illustrate an effect of a partial tree searching scheme according to an exemplary embodiment of the present invention.
Figure 6B:
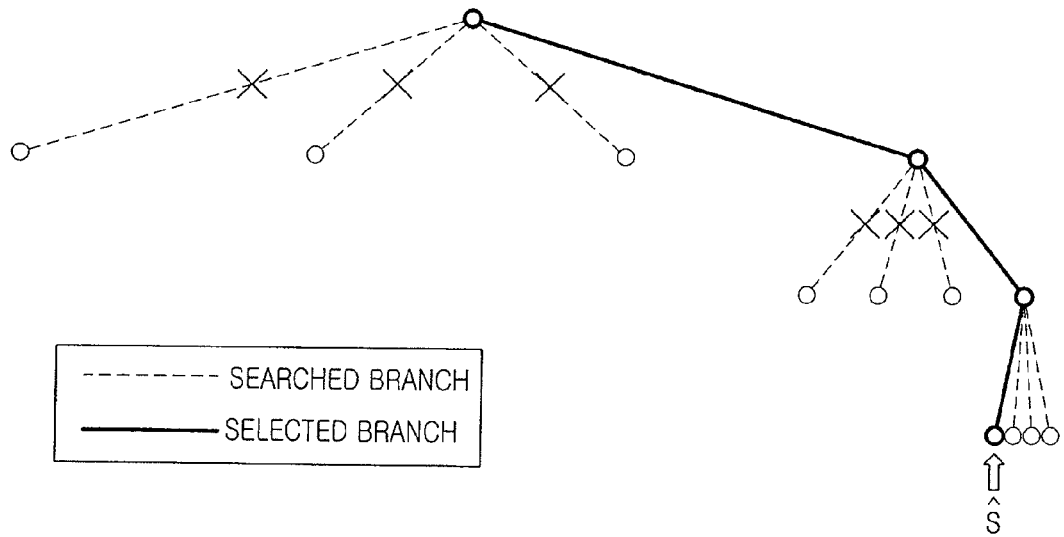

FIGS. 6A and 6B illustrate an effect of a partial tree searching scheme according to an embodiment of the present invention. Specifically, FIG. 6A illustrates a method of detecting a received symbol using the conventional QRD-M algorithm (M=4) in a QPSK-based 3×3 V-BLAST communication system, and FIG. 6B illustrates a method of detecting a received symbol using a partial tree searching scheme according to an exemplary embodiment of the present invention.

In the conventional QRD-M algorithm, the number of branches needed to be searched is $4+4^2+4^2=36$. However, in the proposed partial tree searching scheme that allows only L (L≧M) branches to survive in each stage, the number of branches needed to be searched is 4+4+4=12. This effect is more noticeable for the higher modulation order. If the modulation order changes to 16 (16QAM), the conventional QRD-M algorithm needs to search $16+16^2+16^2=528$ branches, whereas the proposed partial tree searching scheme needs to search only 16+16+16=48 branches.

Figure 7A:
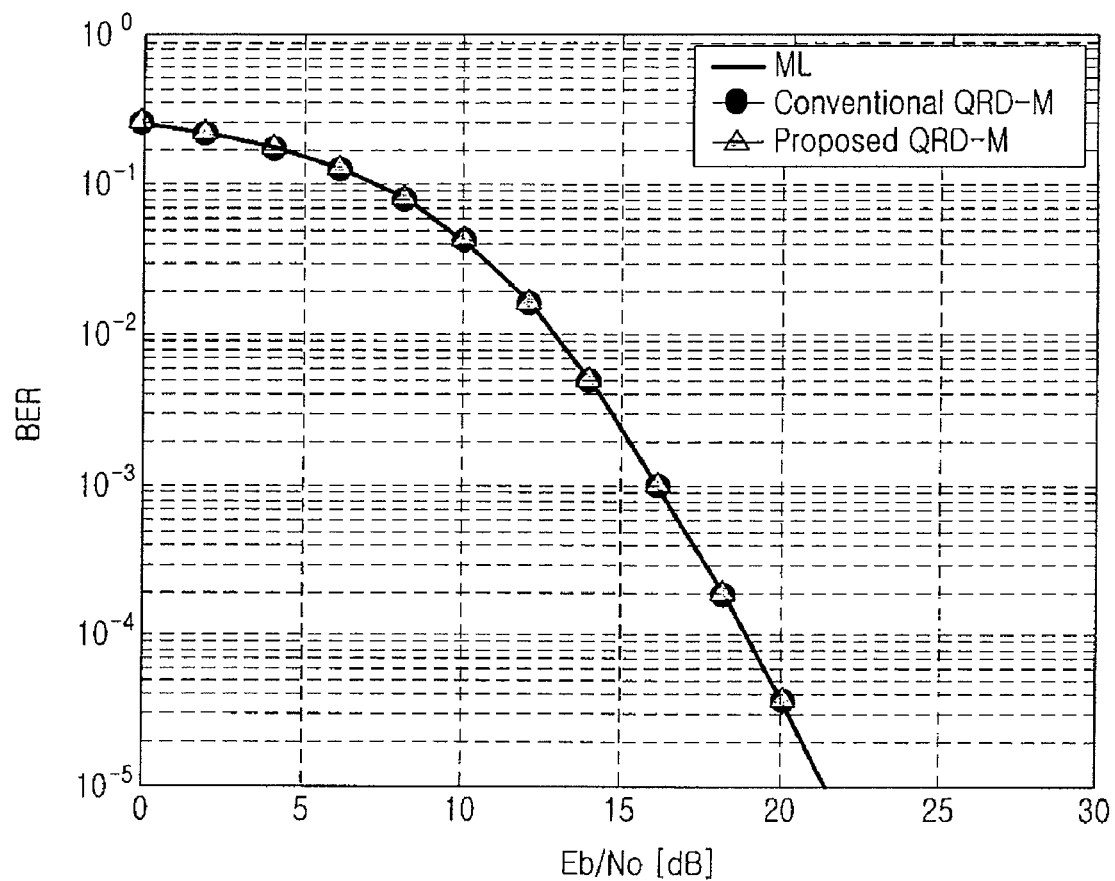
FIGS. 7A and 7B illustrate performance and complexity comparison between an exemplary embodiment of the present invention's partial tree searching scheme and the conventional QRD-M algorithm.
Figure 7B:
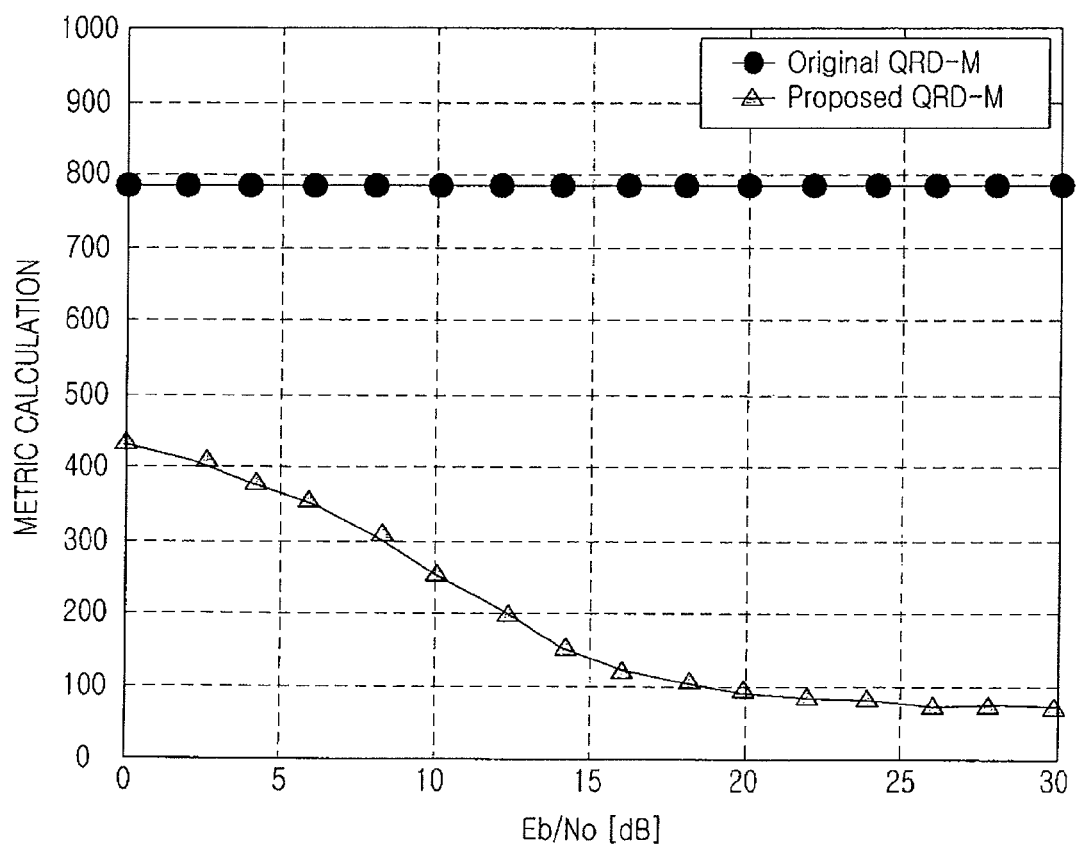

FIGS. 7A and 7B illustrate performance and complexity comparison between an exemplary partial tree searching scheme of the present invention and the conventional QRD-M algorithm.

Specifically, FIG. 7A illustrates performance comparison between the conventional QRD-M algorithm and a partial tree searching scheme according to an exemplary embodiment of the present invention. As illustrated, both the conventional QRD-M algorithm and an exemplary partial tree searching scheme of the present invention approach the ML performance in terms of the performance.

FIG. 7B illustrates complexity comparison between the conventional QRD-M algorithm and the partial tree searching scheme according to an exemplary embodiment of the present invention. The conventional QRD-M algorithm (M=16) requires complexity of about 784 in the amount of metric calculation regardless of the channel status. However, with use of the proposed partial tree searching scheme, the conventional complexity (amount of metric calculation) can be reduced by about 91%.

As is apparent from the foregoing description, exemplary embodiments of the present invention can noticeably reduce the calculation in estimating a received signal, compared to the conventional QRD-M algorithm, thereby contributing to a reduction in the complexity.

While the invention has been shown and described with reference to a certain exemplary embodiment thereof, it will be understood by those skilled in the art that various changes in form and details may be made therein without departing from the spirit and scope of the invention as defined by the appended claims and their equivalents.

What is claimed is:

1. A method for detecting a signal in a communication system using at least two transmit antennas, the method comprising: selecting a symbol corresponding to a lowest branch metric from among a plurality of symbols, the number of symbols corresponds to a modulation scheme; determining a candidate symbol by extending the selecting of the symbol corresponding to a lowest branch metric from among a plurality of symbols corresponding to the previously selected symbol, to a number which is less by one than the number of the transmit antennas; setting an accumulated branch metric of the candidate symbol as a threshold; removing at least one symbol having an accumulated branch metric higher than the threshold; selecting, as a last received symbol, a symbol corresponding to a path having the lowest accumulated branch metric from among paths selected without being removed until a last stage; and when accumulated branch metrics of all the extended symbols are higher than the threshold, estimating a symbol having the threshold as a last received symbol.

2. The method of claim 1, further comprising:
when an accumulated branch metric of the symbol corresponding to the path selected without being removed until the last stage is lower than the threshold, updating the threshold to the accumulated branch metric of the symbol corresponding to the path selected without being removed until the last stage; and
reducing the number of paths selected without being removed until the last stage by repeating the removing of the at least one symbol having an accumulated branch metric higher than the updated threshold.

3. The method of claim 1, wherein if the modulation scheme comprises at least one of Binary Phase Shift Keying (BPSK), Quadrature Phase Shift Keying (QPSK), 16-ary Quadrature Amplitude Modulation (16 QAM), and 64QAM, each symbol is extended to any one of 2, 4, 16 and 64 symbols.

4. The method of claim 1, wherein the lowest accumulated branch metric and branch metric are determined depending on a Euclidean distance.

5. A method for detecting a signal in a communication system using two transmit antennas, the method comprising:
extending a received signal to a first plurality of candidate symbols, the number of which corresponds to a modulation scheme;
determining an accumulated branch metric of each of the first plurality of candidate symbols;
selecting a first candidate symbol having a lowest accumulated branch metric from among the accumulated branch metrics;
extending the selected first candidate symbol to a second plurality of candidate symbols, the number of which corresponds to the modulation scheme, and determining a second candidate symbol having a lowest accumulated branch metric from among the second plurality of candidate symbols;
determining, as a first threshold, the accumulated branch metric of the determined second candidate symbol;
removing any candidate symbol having an accumulated branch metric higher than the first threshold from among all candidate symbols; and
extending a non-removed candidate symbol to a third plurality of candidate symbols, the number of which corresponds to the modulation scheme, and detecting, as a last received symbol, a candidate symbol having a lowest accumulated branch metric among the third plurality of candidate symbols.

6. The method of claim 5, wherein the lowest accumulated branch metric is determined depending on a Euclidean distance.

7. The method of claim 5, wherein if the modulation scheme comprises at least one of Binary Phase Shift Keying (BPSK), Quadrature Phase Shift Keying (QPSK), 16-ary Quadrature Amplitude Modulation (16QAM), and 64QAM, each symbol is extended to any one of 2, 4, 16 and 64 symbols.

8. A method for detecting a signal in a communication system using three transmit antennas, the method comprising:
extending a received signal to a plurality of first candidate symbols, the number of which corresponds to a modulation scheme;
determining an accumulated branch metric indicating a Euclidean distance of each of the plurality of first candidate symbols;
selecting one of the plurality of first candidate symbols having a lowest accumulated branch metric among the accumulated branch metrics;
extending the selected first candidate symbol to a plurality of second candidate symbols, the number of which corresponds to the modulation scheme;
selecting one of the plurality of second candidate symbols having a lowest accumulated branch metric from among the extended candidate symbols;
branching the selected second candidate symbol into a plurality of third candidate symbols, the number of which corresponds to the modulation scheme;

determining, as a first threshold, one of the plurality of third candidate symbols having a lowest accumulated branch metric among the branched candidate symbols;

removing a candidate symbol corresponding to an accumulated branch metric higher than the first threshold from among all candidate symbols;

extending each of the non-removed candidate symbols to a plurality of fourth candidate symbols, the number of which corresponds to the modulation scheme;

selecting one of the plurality of fourth candidate symbols having a lowest accumulated branch metric;

when an accumulated branch metric of the selected fourth candidate symbol is lower than the first threshold, extending the fourth candidate symbol to determine a second threshold;

extending a candidate symbol having an accumulated branch metric higher than the second threshold among the candidate symbols to a plurality of fifth candidate symbols, the number of which corresponds to the modulation scheme; and detecting, as a last received symbol, a candidate symbol having a lowest accumulated branch metric among the plurality of fifth candidate symbols.

9. An apparatus for detecting a signal in a communication system using at least two transmit antennas, the apparatus comprising:

a tree structure generator for generating a tree having a plurality of candidate symbols for signal detection and a plurality of branches for connecting the candidate symbols by performing QR decomposition on a channel estimation matrix and for multiplying the decomposition result by a received signal;

a branch metric calculator for calculating metrics of the plurality of branches;

an accumulated branch metric calculator for calculating an accumulated branch metric of at least one of the plurality of branches connected to each of the candidate symbols by accumulating metrics of each of the plurality of branches;

a path selector for selecting a candidate symbol having a lowest accumulated branch metric separately in each stage of the tree, and for selecting a path for allowing the accumulated branch metric to be lowest in a last stage;

a threshold determiner for determining a lowest accumulated branch metric in the last stage, as a threshold for removing any of the plurality of branches that are unnecessary in each stage;

a branch selector for selecting a remaining branch except for a branch connected to a candidate symbol having an accumulated branch metric lower than the determined threshold; and a controller for detecting a last received signal.

10. The apparatus of claim 9, wherein the lowest accumulated branch metric and branch metric are determined depending on a Euclidean distance.

11. The apparatus of claim 9, wherein the controller detects, as a last received signal, a candidate symbol having a lowest accumulated branch metric among candidate symbols in the last stage.

12. The apparatus of claim 9, wherein the number of the plurality of candidate symbols and the number of the plurality of branches for connecting the plurality of candidate symbols are determined according to a modulation scheme.

* * * * *